Jan. 14, 1936.  V. P. McVOY  2,027,395
WATER RECLAIMER
Filed Nov. 28, 1934  3 Sheets-Sheet 1

Inventor
Vincen P. McVoy,
By E. W. Bond
Attorney.

Jan. 14, 1936.     V. P. McVOY     2,027,395
WATER RECLAIMER
Filed Nov. 28, 1934     3 Sheets-Sheet 3

Inventor
Vincen P. McVoy,
E. N. Bond
Attorney

Patented Jan. 14, 1936

2,027,395

UNITED STATES PATENT OFFICE 2,027,395

WATER RECLAIMER

Vincen P. McVoy, Mobile, Ala.

Application November 28, 1934, Serial No. 755,235

2 Claims. (Cl. 202—53)

The present invention relates to an apparatus and a method or process for reclaiming water, and has for an object to provide means and a method for utilizing waste heat in waste condenser cooling water such as is discarded in various types of power plants for recovering substantially pure water from the waste water and which is devoid of contamination, sediment, salt, alkali and the like.

Another object of the present invention is to provide a method and means for treating surface water or water from rivers, streams, the sea and the like for extracting the undesirable constituents thereof by application of heat and a vacuum to thereby obtain the desired separation without boiling the water. This object of the invention has in mind the elimination of evaporators and other means or devices which require high temperatures for their successful operation.

Another feature of the present invention is to provide improved means and a process or method for vaporizing water at a relatively low temperature so that the normal temperatures of waste about power plants will be sufficient for the complete and satisfactory and rapid recovery of additional and substantially purified water for drinking purposes, for use in the boilers of the power plant and for various other uses or purposes for which clean and relatively pure power is necessary.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary longitudinal section taken vertically through a dredge showing an actual installation of water recovery apparatus constructed according to the present invention.

Figure 1:
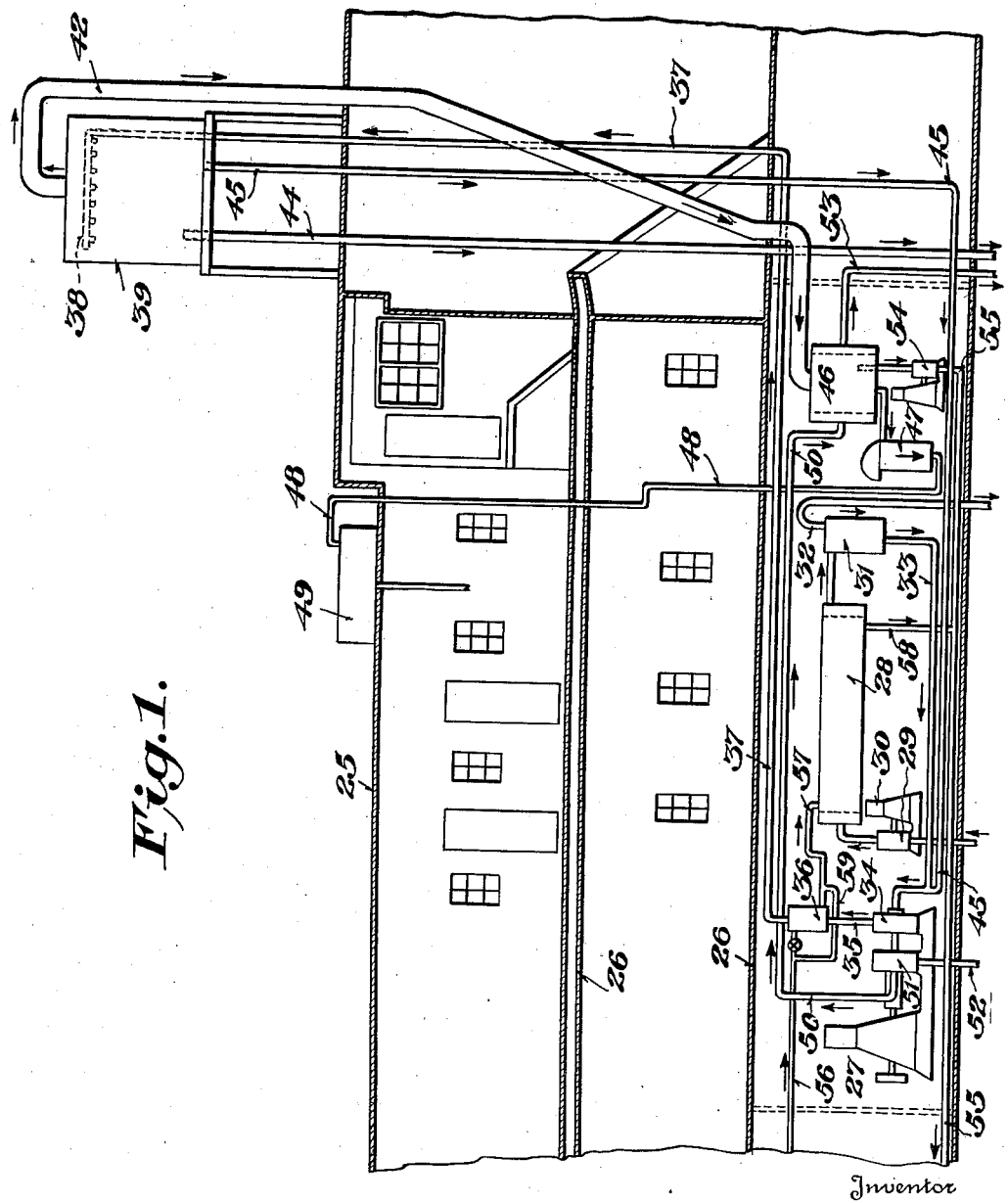

Referring now to the drawings, and first to Figure 1, 25 designates the body portion of a dredge of conventional type having decks 26 and which has below the first deck 26 an engine room 27 in which is usually located an auxiliary condenser 28 to one end of which is connected a circulating pump 29 driven by an engine 30. The pump 29 delivers surface water, or water from outside the dredge 25, through the condenser 28 to cool the latter and into a separating tank 31 which retains the hot water from the condenser. An overflow pipe 32 leads from the top of the tank 31 to the outside to discharge surplus water from the tank 31. From the lower end of the tank 31 a feeder pipe 33 extends to the intake of the hot water reclaimer circulator 34. From the circulating pump 34 the hot water is fed through pipe 35 to a heater 36 through which the further heated water is conducted by pipe 37 to a sprinkler head 38 disposed in the upper portion of a reclaimer cylinder 39.

Figure 3:
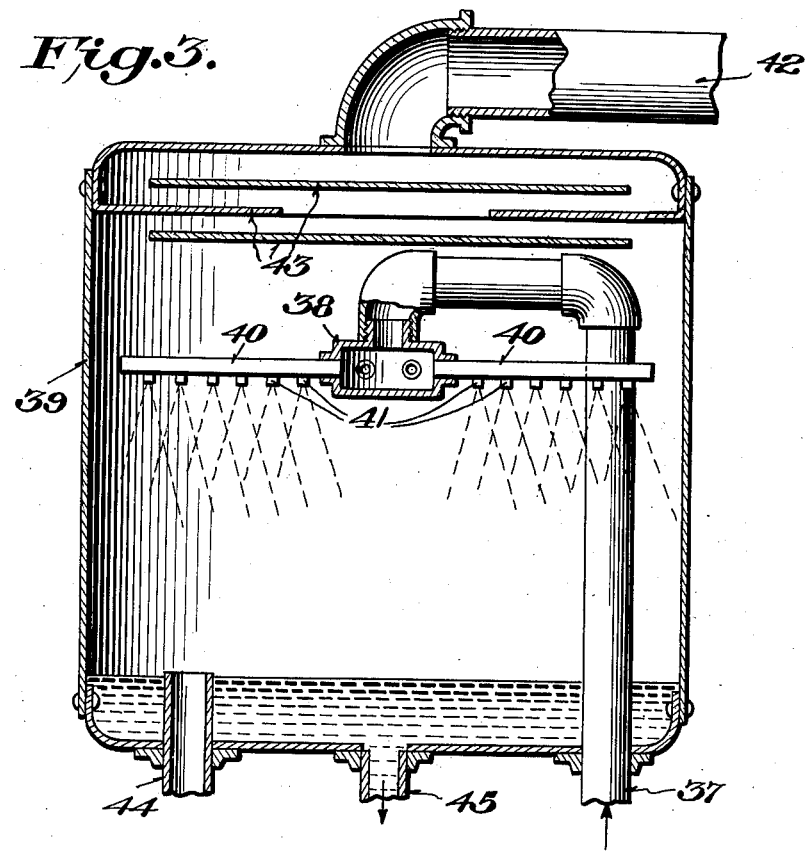
Figure 3 is an enlarged vertical section taken through the reclaimer cylinder such as used in all forms of the apparatus.

With reference to Figure 3, the reclaimer cylinder 39 may have the pipe 37 extend upwardly in one side thereof and overturned to a central position near the top of the cylinder 39.

The head 38 comprises a hollow hub from which radiate a number of hollow arms 40 formed with a large number of depending apertured projections 41 through which the hot water is sprayed so as to hook up the body of water and spread it over a large area of the lower portion of the cylinder 39 so that the vapor may rise to the top of the cylinder. A vapor pipe 42 leads from the upper end of the cylinder 39 and the latter has a plurality of baffle plates 43 which separate the water content from the vapor so that the salts and other constituents of the hot water will not pass out through the vapor pipe 42 with the vapor. An overflow pipe 44 leads down from the cylinder 39 and rises through the bottom thereof a desired distance to entrap a small body portion of the hot water, and salts, and other residue pass out through this drain or overflow pipe 44. A circulating return pipe 45 leads from the bottom of the cylinder 39 into the main intake of the hot water circulating pump 34 to complete the circulating system. The hot water from the tank 31 builds up the circulation and maintains the necessary body of water in the main system which is depleted by the overflow from the drain pipe 44 and the vapor pipe 42. The vapor pipe 42 leads to the intake of the reclaimer condenser 46 and the condenser vapors or water are taken off by means of the automatic force trap 47 from which the water is conducted through pipe 48 into a storage tank 49 for general drinking and other uses. The force trap 47 may be of any known structure, such as is disclosed in my U. S. Patent No. 1,508,077 dated January 5, 1926.

The condenser 46 is operated by cold water fed through a pipe 50 from a pump 51 which obtains its supply from the pipe 52 which leads outside the dredge 25. The water passing through the condenser 46 and out of pipe 53 to the exterior of the dredge.

A dry air pump 54 is connected to the intermediate portion of the condenser to revive all noncondensable gases, such as oxygen, air leakage, etc. and to maintain about 28 inches of vacuum, that is about 1 pound per square inch absolute pressure in the condenser 46, vapor pipe 42 and cylinder 39 effecting the rapid vaporization in the cylinder. The high vacuum is essential to the rapid operation of the device and the production of the pure condensed vapor water at a high rate. The pump 54 delivers the air and condensation through the pipe 55 to the hot well for the feed pump of the dredge.

The heater 36 is operated by exhaust steam from pumps and the like fed through pipe 56 to the heater 36 and from heater into auxiliary condenser 28 through pipe 57. The condensation from the condenser 28 is carried off through pipe 58 into pipe 55 and thence to the hot well of the dredge for boiler supply.

The heater 36 may have a by-pass 59 so that the exhaust steam will not pass through the heater 36 when the dredge is in operation and at which time the heater is not essential.

The operation of the device as thus installed upon a dredge, or an equivalent power plant, and the process or method of operation is as follows.

The circulating pump 29 draws sea or surface water into the system by forcing the sea water through the tubes to the condenser 28 and out into the tank 31, any overflow being carried off through the overflow pipe 32 which discharges back into the sea, river or the like. The water in passing through the condenser 28 is raised in temperature by condensing the exhaust steam from the plant which enters through the pipes 56 and 57 and which is discharged from the condenser through the pipe 58 and the pipe 55 carrying the condensate back to the hot well of the plant for boiler purposes.

The heated sea water, which has passed through the condenser 28 for cooling purposes, is carried from the tank 31 through the pipe 33 to the intake of a circulating hot water pump 34, and from the pump 34 the water is forced in circuit through the pipe 35, a heater 36 if desired, but not necessary, and through the pipe 37 which rises in the reclaimer cylinder 39.

The hot water in the circuit is sprayed from the pipe 37 through the spray nozzle or distributor 38 and is permitted to fall or gravitate in fine divided streams throughout the cross sectional area of the cylinder 39. As the cylinder 39 constitutes a vacuum chamber, the vapors of the hot water are liberated therefrom under a relatively low temperature due to the high vacuum maintained. The unevaporated water accumulating in the lower end of the cylinder 39 is carried off in circuit through the pipe 45 back to the intake side of the hot water circulating pump 34 so that the water is recirculated. If desired, this recirculated water may be returned to its original temperature by passage through the heater 36. The drain or overflow pipe 44 which is always ready to carry off excess accumulations of water in the bottom of the reclaimer cylinder or chamber 39, may be utilized, when the heater 36 is not in operation, to circulate the water from the interior of the cylinder 39 back to the sea, river or the like. The reclaimer cylinder 39 is preferably disposed at a desired height sufficient to give the desired height or length to the overflow pipe 44, which is, of course, water sealed at its lower outlet end, to maintain the vacuum in the chamber or cylinder 39. When the heater 36 is not used, the entire body of the cooling water which passes through the condenser 28 and the tank 31 is carried off through the pipe 33 through the circulating system including the pipe 37 to the reclaimer cylinder 39 and thence is discharged through the overflow pipe 44.

The vapors from this water so circulated are carried off through the vapor pipe 42 as in all instances of operation of the apparatus.

The vapors accumulating in the upper end of the reclaimer cylinder 39 are further separated from the water content by the baffles 43, shown in detail in Figure 3, and the relatively dry vapor is carried under suction through the vapor pipe 42 to the reclaimer condenser 46, the condensate being collected as relatively pure and separated water in the trap or water pump 47 which is connected to the pipe 48 for discharging the water in the storage tank 49, or at any other suitable point of deposit.

The reclaimer condenser 46 is cooled by water which is drawn in from the sea, river or the like through the pipe 52 by a pump 51 which delivers the water through the pipe 50 to one end of the condenser 46, the cooling water being discharged from the condenser 46 through the pipe 53 which empties into the sea. This second surface water circuit is used as it is relatively cool as compared with the circulating water through the condenser 28. The vapors from the pipe 42 transmit a relatively small amount of heat to the surface water passing through the condenser 46 and consequently as discharged through the pipe 53 the condenser waste water is too cool to be of any value in the reclaiming process.

During all operations of the reclaimer cylinder 39 the dry air pump 54 is operated so as to maintain a relatively high vacuum not only in the condenser 46 but also in the vapor pipe 42 and the chamber 39, and the vapor pipe 42 is of relatively large diameter so as to maintain the vacuum. The connection of the pump 54 is not at the bottom of the condenser 56 but is at an intermediate point between the top and bottom thereof but preferably toward the lower end of the condenser so as to remove oxygen, uncondensable gases, air leakage and the like from the best point of vantage of the condenser. As heretofore explained a certain amount of moisture will be carried off through the pump 54, and this moisture together with the air and gases is carried off through the pipe 55 to the hot well of the plant for boiler purposes.

Figure 2:
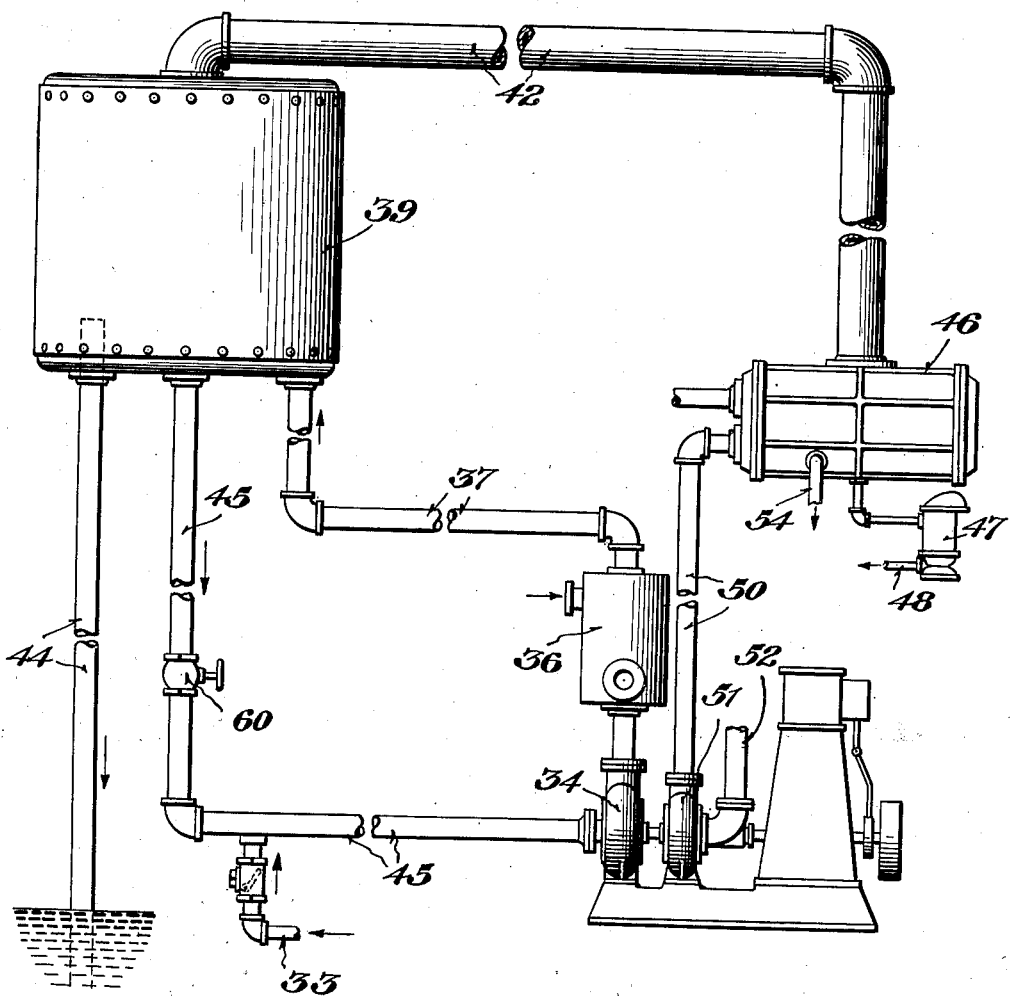
Figure 2 is a diagrammatic elevation of a slightly modified form of the apparatus embodying the features of the present invention.

With reference now to the slightly modified arrangement shown in Figure 2, it embodies the same method or process as above explained. This slight modification is more in the nature of a simplified structure wherein the reclaimer cylinder 39 is connected by the vapor pipe 42 with the condenser 46 but wherein the vapor pipe is carried off in different angular relations from the reclaimer cylinder 39 to suit conditions of arrangement and relative positions of the condenser 46, the heater 36 and its adjacent parts.

It will be noted that the pipe 33, discharging from the tank 31, not shown, enters the circuit pipe 45 which leads to the hot water pump 34.

In the carrying out of the method and process, and in the actual operation of the device in reclaiming approximately 300 gallons of water per hour, 15 gallons per minute of the waste hot water enters the pipe 33 and circuit pipe 45 and is delivered through the sprinkler head 38 to the interior of the reclaimer cylinder 39. Approximately five gallons of this water is carried off in vapor form through vapor pipe 42 into the reclaimer condenser 46 while approximately ten gallons of the water from the cylinder 39 is carried off through the overflow or drain pipe 44, carrying off the heavy constituents of the water solution. The salt and other impurities are thus carried directly overboard and are not subsequently brought into contact with any other parts of the apparatus. It may be here remarked that it is this salt and other impurities which give considerable trouble in the use of evaporators and other devices in attempting to carry out this water separation or purification. The upper leg of the pipe 45 may be provided with a valve 60 disposed between the cylinder 39 and the pipe 33 for closing the upper portion of the pipe 45 to insure a circulating of the hot water from the pipe 33 up through the pump 34, pipe 37, sprinkler head 38 and chamber 39 and out through the overflow pipe 44. This latter method of operation is utilized only where there is a sufficient quantity of hot surface water in the pipe 33 to carry out the process without the use of the heater 36.

Where the substantially closed circuit is used, the valve 60 being open, the heater 36 is employed for bringing up the circulating water to the original normal temperature of operation which may be approximately 110° F.

Figure 4:
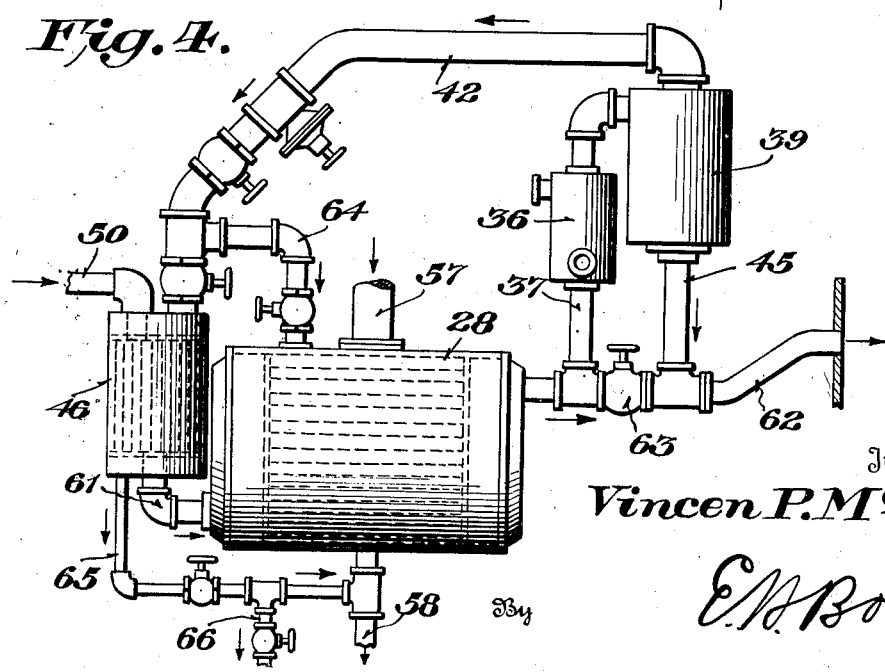
Figure 4 is a diagrammatic elevation of the reclaimer cylinder connected in circuit with the usual condenser system.

With reference now to the modification shown in Figure 4, the main condenser 28 is provided with the exhaust inlet pipe 57 from the main exhaust of the main engine of a plant or the like and the lower end of the condenser 28 is provided with the pipe 58 which carries off the condensed steam and may be provided with the usual air pump on the end of same.

The surface water intake pipe 50 passes through the reclaimer condenser 46 first and is thence carried by a suitable connection 61 to the main condenser 28, and after passing through the main condenser 28 is carried out through the pipe 37 to the top of the reclaimer cylinder 39. In this instance the pipe 37 may be carried up at the outer side of the cylinder 39 instead of through it as shown in Figures 1 and 3. The pipe 37 is provided with a branch discharge pipe 62 controlled by a valve 63 so that the water from the main condenser may be discharged directly through the valve 63 and pipe 62 to the exterior of the plant when the reclaiming cylinder 39 is not in use.

The reclaimer cylinder 39 has its return pipe 45 branched into the pipe 62 beyond the valve 63 so that the water accumulating in the bottom of the cylinder 39 containing the impurities may be discharged directly from the plant. A by-pass pipe 64 may be coupled between the vapor pipe 42, adjacent the condenser 46 and the main condenser 48, suitable valves being provided for controlling the use of the by-pass 46 to take off the overload on the smaller condenser 46. The vapor condensation in the form of water may be drawn off from the condenser 46 through a pipe 65 which is connected to the condensed water pipe 58 of the main condenser 28 and which may also be provided with a branch pipe 66 for taking off the water of condensation from the vapors by means of any suitable means, such as an independent pump or the like. Suitable valves are used in the various pipes and branch pipes for controlling the operation as desired.

What is claimed is:—

1. That process of recovering pure water at approximately 300 gallons per hour by use of the heat of waste condenser cooling water under low absolute pressure, which consists in spraying under pressure a large volume of said waste water at approximately 110° F. over a large area in a vacuum chamber disposed at least the vacuum seal height above the surface water level, maintaining said chamber under about 1 pound per square inch absolute pressure, continuously force recirculating a large portion of the unvaporized waste water from said chamber, withdrawing the water vapors from said chamber, condensing the same, and wasting the unvaporized waste water in excess of that required to prime the circulation of the waste water.

2. That process of recovering pure water from impure water under low absolute pressure, which consists in continuously force circulating a large volume of said impure water at substantially 110° F. through a vacuum chamber disposed at least the vacuum seal height above the surface water level, adding a volume of water to said circuit, maintaining said chamber under approximately 1 pound per square inch absolute pressure, extracting water vapors in about the proportion of one-third of the added water volume, condensing said water vapors, and wasting the remaining approximately two-thirds of the added volume of water from the chamber.

VINCEN P. McVOY.